United States Patent [19]

Pietzsch et al.

[11] 4,136,913

[45] Jan. 30, 1979

[54] ROD CONNECTOR FOR AN ENDLESS TRACK

[75] Inventors: Ludwig Pietzsch, Karlsruhe; Harald Kauer, Ettlingen; Rudolf Hartmann, Karlsbad-Auerbach, all of Germany

[73] Assignee: Dr.-Ing. Ludwig Pietzsch, Ettlingen, Germany

[21] Appl. No.: 784,714

[22] Filed: Apr. 5, 1977

[30] Foreign Application Priority Data

Dec. 21, 1976 [DE] Fed. Rep. of Germany ....... 2657905

[51] Int. Cl.² ............................................. B62D 55/20
[52] U.S. Cl. ............................................... 305/58 PC
[58] Field of Search ....................... 305/58 PC, 59, 11; 403/389, 387, 391, 396

[56] References Cited

U.S. PATENT DOCUMENTS

| 1,004,574 | 10/1911 | Jones | 403/391 |
| 3,431,538 | 3/1969 | Hubbard et al. | 403/391 X |

FOREIGN PATENT DOCUMENTS

1093240 11/1960 Fed. Rep. of Germany ...... 305/58 PC

*Primary Examiner*—Stanley H. Tollberg
*Assistant Examiner*—John P. Shannon
*Attorney, Agent, or Firm*—Lawrence E. Laubscher

[57] ABSTRACT

This invention relates to an endless track having chain links which are connected by connectors as well as rod members extending through the connectors.

A connection between the connectors and rods is provided by clamping contact surfaces on the rods and connectors in abutment with other, at least one of said contact surfaces comprising at least one depression arranged around the circumferential area of the bolt or connector contact surface, whereby a friction lock preventing the bolts from moving axially and/or rotating with respect to the connectors is achieved.

6 Claims, 2 Drawing Figures

U.S. Patent
Jan. 30, 1979
4,136,913
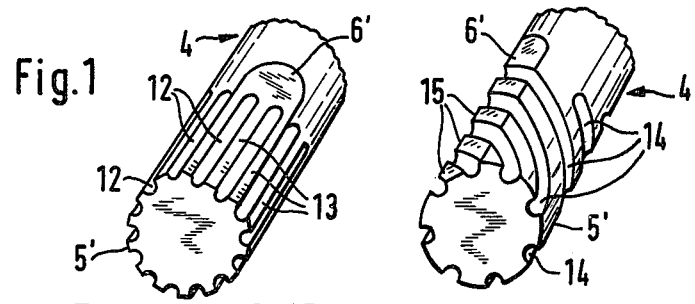
Fig.1
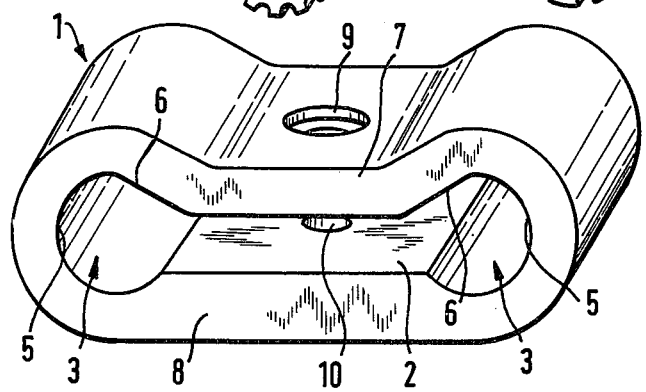
Fig.2
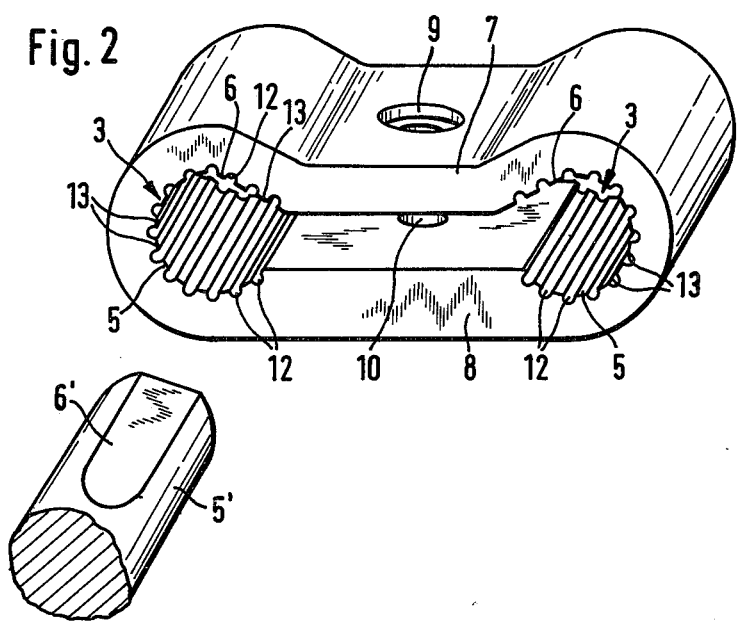

ROD CONNECTOR FOR AN ENDLESS TRACK

BRIEF DESCRIPTION OF THE PRIOR ART

The instant invention relates generally to an endless track, the chain links of which comprise tubular bodies arranged transverse to the direction of movement and connected to the adjacent chain links, as seen in the direction of movement, by connectors as well as rod members which extend through the connectors and through the tubular bodies. More specifically, the invention relates to the connection between the rod ends and caterpillar track end connectors which are disposed laterally of the caterpillar track.

With known endless tracks a retaining force between the rod ends and the end connectors usually is obtained by clamping the two halves of an end connector of divided or integral structure against each other by means of a clamping bolt. Thereby the end connectors provided with recesses hold the rod ends clamped, for instance, at flat sections of the rod ends and connectors abutting each other and extending parallel with the axis. The frictional retaining force thus established is limited. Yet it is sufficient when it is not necessary to transmit axial forces between the rods and the end connectors. However, if axial forces must also be transmitted and if slippage of the rods in their longitudinal direction with respect to the end connectors is to be prevented, particularly with an endless track provided with a lateral support of the tubular bodies and/or the connector links according to U.S. patent application Ser. No. 767,209, filed on Feb. 9, 1977 in the name of Hans-Peter Stolz, the retaining force generated in the known manner is not sufficient. This is so because, on the one hand, the axial forces between the rods and the end connectors may become very large and, on the other hand, because the tightening torque of the clamping bolt and the coefficient of friction between the rods and the end connectors, two parameters which determine the magnitude of the retaining force, cannot be kept constant in practice.

Assembly is rendered difficult by the need for constant accurate adjustment according to specification of the tightening torque and is practically impossible under the rough actual conditions of replacement of chain elements in practice. Moreover, the entry of lubricant or dirt particles between the friction faces when mounting or exchanging chain elements cannot be avoided with the know design. Consequently, the coefficient of friction varies uncontrollably. Thus the tightening torque prescribed for a certain coefficient of friction does not correspond to the respective coefficients of friction prevailing in actual practice. Undesired slippage of the rods relative to the end connectors may be the result so that the end connectors and/or rods will no longer have the proper operating positions. This may be the cause of uneven running and damage to the track.

SUMMARY OF THE INVENTION

Therefore, it is an object of the present invention to provide an endless track of the kind defined initially such that the rod ends are prevented from slipping with respect to the end connectors which are disposed laterally of the endless track to connect adjacent chain elements. This is particularly important with an endless track having a lateral support according to the above cited U.S. patent application, Ser. No. 767,209, because when an endless track of such design bends, there is a strong tendency for the rods to slip axially with respect to the end connectors entailing all of the disadvantageous consequences mentioned.

It is further object of the invention to design a friction-lock connection between the rod ends and end connectors of an endless track of the kind set forth such that a defined friction force is generated which positively surpasses axial displacement and/or torsional forces.

It is yet another object of the invention to provide a friction lock connection between the rod ends and end connectors of an endless track of the kind set forth, wherein the required great frictional force is applied by simple contact pressure between faces in parallel with the axis.

To solve these and other objects the invention provides at least one recess or depression arranged around the circumference of the rod member in the area of contact of the rod end and/or connector link in an endless track of the kind set forth.

The recess or recesses form spaces which will take up lubricant from between the contact faces or extraneous matter, such as dust and dirt squeezed out by the clamping action so that any foreign matter will be removed from the contact surfaces. This makes it possible to realize the greatest possible coefficient or friction which is predetermined by the materials of the rod and the connector link. As the frictional force transmitted is proportional to the coefficient of friction and to the clamping force, the design according to the invention affords the greatest possible frictional force at any given clamping force.

The invention always warrants the same frictional condition of the contact surfaces between the rods and end connectors in practical application where rough ambient conditions are to be expected, such as operation in the open under unfavorable climatic circumstances and on bad ground (such as dust and mud). So far, this could be hoped for only with complicated and expensive procedures of carefully cleaning and degreasing the respective parts before installation. Therefore, the invention can also be used advantageously when no axial force is transmitted between the rods and the end connectors because the automatic self-cleaning effect and unvarying frictional conditions always are favorable.

The recesses may be provided either in the rod member or in the respective openings of the end connectors, or in both. They may be embodied, for instance, by longitudinal or helical grooves such as a coarse thread, the tips of the flanks of the thread being cut off to provide the contact surface between the courses of the thread. Furthermore the recesses or depressions may be formed by milling or knurling, e.g. cross hatching. If longitudinal grooves are chosen, they should preferably be machined in the end connector openings since this allows simple and inexpensive manufacture by broaching or similar removal techniques.

Preferably either the rod ends or the openings in the connector links should be provided with the recesses because this is simpler in production, affords clear contact surfaces, and fulfills the purpose of keeping the contact surfaces free of lubricant and foreign matter, respectively, to full satisfaction.

BRIEF DESCRIPTION OF THE FIGURES

The invention will be described further, by way of example, with reference to the accompanying drawings which show different embodiments and in which:

FIG. 1 is a perspective exploded view of an end connector and two rod ends of different design with recesses according to the invention, FIG. 2 is a perspective exploded view of an end connector, the openings of which are provided with recesses according to the invention, and of a corresponding rod.

DETAILED DESCRIPTION

The end connector 1 shown in FIG. 1 is of unitary construction. It has an elongated through opening 2 the ends of which are widened to form recesses or openings 3 to receive rod members 4. The recesses are adapted to receive the rod ends in that they have a hollow cylindrical portion 5 extending over the major part of the circumference and a flattened portion 6 arranged on a chord of a circle, a segment of which is defined by the hollow cylindrical portion 5. The rods are formed accordingly with a cylindrical portion 5' and a flattened portion 6'. The recesses are machined to correspond to the rod ends.

Two bridge members 7, 8 in the central portion of the connector may be forced against each other by a clamping bolt which is not shown and adapted to be inserted in through holes 9, 10 in the two bridge members and tightened by a lock nut likewise not shown. Alternatively the hole 10 in bridge member 8 may be designed as a threaded hole.

While the openings 3 of the connector 1 have a smooth surface, longitudinal grooves 12 of a length extending across the width of the connector are machined into the rod shown on the left in FIG. 1. Surface portions or lands 13 remain between the longitudinal grooves 12 and with the rod installed they are in contact with the smooth surfaces 5, 6 of the opening 3.

Instead of longitudinal grooves the rod member shown on the right hand side in FIG. 1 has a plurality of helical grooves 14 at the rod end cooperating with the opening. Again contact surfaces 15 between the grooves 14 cooperate with the smooth surfaces 5, 6 of the opening. It is also possible to provide a single groove 14 which will have a correspondingly low pitch.

In the embodiment shown in FIG. 2, the rod ends have a smooth cylindrical surface 5' and smooth flattened portions 6' whereas the openings 3 have longitudinal grooves 12 and raised contact surfaces 13 between the grooves 12 as well as in their cylindrical portions 5 and in their flattened portions 6 for cooperation with the rod surfaces 5', 6'. The longitudinal grooves 12 can be produced by broaching in an easier and less expensive manner than longitudinal grooves 12 on the outer surface of the rod 4 in FIG. 1.

In the case of the connections according to FIGS. 1 and 2 the tightening of the bolt not shown, which passes through holes 9, 10, produces a clamping force which acts vertically with respect to the contact surfaces and has a higher specific surface loading than with smooth contact surfaces. This clamping force presses residual lubricant and any possible foreign matter from between the contact surfaces into the grooves 12, 14 so that the greatest possible coefficient of friction determined by the pairing of materials of the rod and the connector 1 prevails between the contact surfaces. If the grooves were not provided, lubricant or foreign particles would unavoidably remain between the contact surfaces thus changing the coefficient of friction and consequently the required clamping force in an unpredictable manner. This is due not only to the lacking space for evasion of undesired matter but also to the fact that the specific surface loading obtained by the same screw tightening torque is smaller.

It is convenient to select the width of the longitudinal grooves 12 or of the helical grooves 14 and the spacings defining the contact surfaces 13, 15, respectively, such that the specific pressure at the contact surfaces is slightly below the flow limit of the materials of rods and end connectors.

The present embodiments are to be considered as in all respects illustrative and not restrictive, the scope of the invention being indicated by the appended claims.

What is claimed is:

1. Connector means for connecting together the adjacent ends of successive chain links of an endless track, comprising
   (a) an end connector member containing transversely extending through openings at its forward and rear ends, respectively, each of said through openings including
       (1) a curved first inner wall contact surface which comprises, in transverse cross-section, a segment of a circle, and
       (2) a flat second inner wall contact surface, said contact surfaces extending the length of said through opening; and
   (b) a pair of cylindrical rod members extending at one end within said openings, respectively, each of said rod members having on its outer periphery
       (1) a curved first outer wall contact surface in contiguous frictional engagement with said first inner wall contact surface, and
       (2) a flat second outer wall contact surface in contiguous frictional engagement with said second inner wall contact surface, whereby said contact surfaces cooperate to prevent rotation of said rod member relative to said end connector member;
   (c) each of the curved and flat contact surfaces of one of said members containing at least one groove, whereby when the corresponding curved and flat contact surfaces are pressed tightly together in tight frictional engagement, foreign matter is removed from the contact surfaces to produce a large constant frictional force between the members for preventing axial displacement of the rod member relative to the connector link.

2. Apparatus as defined in claim 1, wherein the flat second inner wall contact surfaces of said end connector member through openings are arranged in wedge-defining relation on a chord of the circle a segment of which is defined by said curved first inner wall contact surface, and further including bolt means connected with said end connector member for forcing the flat inner wall contact surfaces in wedging engagement with said flat outer wall contact surfaces.

3. Apparatus as defined in claim 1, wherein the grooves defined in the flat and curved wall surfaces of said member extend longitudinally of the associated through opening.

4. Apparatus as defined in claim 3, wherein said grooves are formed by broaching.

5. Apparatus as defined in claim 1, wherein the grooves are formed in the curved and flat outer wall portions of said rod member by a helical groove extending continuously about the outer periphery of said rod member.

6. Apparatus as defined in claim 2, wherein the dimension of each of said grooves is such relative to the compressional stress applied to said contact surfaces that the stress is below the yield point of the material from which said one member is found, whereby deformation of the member which would cause flow of the material into the groove is prevented.

* * * * *